United States Patent
Yokoshi

(10) Patent No.: US 8,814,965 B2
(45) Date of Patent: Aug. 26, 2014

(54) CUBIC BORON NITRIDE SINTERED BODY AND COATED CUBIC BORON NITRIDE SINTERED BODY AND PREPARATION PROCESSES THEREOF

(75) Inventor: Sho Yokoshi, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 212 days.

(21) Appl. No.: 13/508,714

(22) PCT Filed: Nov. 11, 2010

(86) PCT No.: PCT/JP2010/070091
§ 371 (c)(1),
(2), (4) Date: May 8, 2012

(87) PCT Pub. No.: WO2011/059020
PCT Pub. Date: May 19, 2011

(65) Prior Publication Data
US 2012/0304544 A1 Dec. 6, 2012

(30) Foreign Application Priority Data
Nov. 11, 2009 (JP) ................................ 2009-258096

(51) Int. Cl.
| | | |
|---|---|---|
| *B24D 3/00* | (2006.01) | |
| *B24D 11/00* | (2006.01) | |
| *B24D 18/00* | (2006.01) | |
| *C09K 3/14* | (2006.01) | |
| *B24B 1/00* | (2006.01) | |
| *B24D 3/02* | (2006.01) | |
| *C09C 1/68* | (2006.01) | |
| *C04B 41/50* | (2006.01) | |
| *C04B 41/00* | (2006.01) | |
| *C04B 35/645* | (2006.01) | |
| *C04B 41/87* | (2006.01) | |
| *C04B 35/119* | (2006.01) | |
| *C04B 35/5831* | (2006.01) | |

(52) U.S. Cl.
CPC ..... *C04B 35/5831* (2013.01); *C04B 2235/3232* (2013.01); *C04B 2235/3886* (2013.01); *C04B 2235/3813* (2013.01); *C04B 41/5068* (2013.01); *C04B 41/009* (2013.01); *C04B 35/645* (2013.01); *C04B 2235/3244* (2013.01); *C04B 41/87* (2013.01); *C04B 35/119* (2013.01); *C04B 2235/3229* (2013.01); *C04B 2235/3225* (2013.01); *C04B 2235/656* (2013.01); *C04B 2235/3208* (2013.01); *C04B 2235/5436* (2013.01); *C04B 2235/5445* (2013.01); *C04B 2235/3856* (2013.01); *C04B 2235/79* (2013.01); *C04B 2235/402* (2013.01); *C04B 2235/3843* (2013.01); *C04B 2235/3217* (2013.01); *C04B 2235/3206* (2013.01); *C04B 2235/80* (2013.01); *C04B 2235/3246* (2013.01)
USPC .................... 51/295; 51/293; 51/307; 51/309

(58) Field of Classification Search
USPC ..................... 51/295, 293, 307, 309
See application file for complete search history.

(56) References Cited

U.S. PATENT DOCUMENTS

| | | | | |
|---|---|---|---|---|
| 5,536,485 | A | * | 7/1996 | Kume et al. .................... 423/446 |
| 2006/0182998 | A1 | * | 8/2006 | Okamura et al. ............. 428/698 |
| 2008/0254282 | A1 | | 10/2008 | Kukino et al. |
| 2010/0313489 | A1 | * | 12/2010 | Teramoto et al. ............... 51/309 |
| 2011/0014426 | A1 | * | 1/2011 | Ohtomo ........................ 428/143 |

FOREIGN PATENT DOCUMENTS

| | | |
|---|---|---|
| JP | 58-058247 | 4/1983 |
| JP | 63-002858 | 1/1988 |
| JP | 2-018310 | 1/1990 |
| JP | 2-044067 | 2/1990 |
| JP | 5-051261 | 3/1993 |
| JP | 5051261 A | 3/1993 |
| JP | 8109070 | 4/1996 |
| JP | 2005-200227 | 7/2005 |

OTHER PUBLICATIONS

Office Action dated Jun. 19, 2013 issued in Chinese counterpart application (201080051107.9).
International Search Report in PCT/JP2010/070091, dated Feb. 15, 2011.
Office Action dated Dec. 10, 2013 issued in counterpart Japanese Application (No. 2011-540533).
Office Action dated Dec. 10, 2013 issued in counterpart Japanese Application (No. 2011-540533) English Translation .
International Preliminary Report on Patentability (IPRP) dated May 15, 2012 issued in counterpart PCT application (PCT/JP2010/070091).

* cited by examiner

*Primary Examiner* — James McDonough
(74) *Attorney, Agent, or Firm* — Womble Carlyle

(57) ABSTRACT

A cubic boron nitride sintered body is excellent in wear resistance. The cubic boron nitride sintered body has about 30 to about 70% by volume of cubic boron nitride; and as the reminder, a binder phase having at least one selected from an oxide, carbide, nitride and boride of Ti, Al, Zr, Y, Ce, Mg or Ca and mutual solid solutions thereof; and inevitable impurities, wherein the cubic boron nitride sintered body contains α-type $Al_2O_3$, $ZrB_2$, $ZrO_2$ and ZrO, and when an X-ray diffraction intensity of a (110) plane of α-type $Al_2O_3$ is represented by Ia, an X-ray diffraction intensity of a (101) plane of $ZrB_2$ is represented by Izb, and an X-ray diffraction intensity of a (111) plane of ZrO is represented by Izo, (Izb/Ia) which shows a ratio of Izb based on Ia satisfies $0.13 \leq (Izb/Ia) \leq 0.30$, and (Izo/Ia) which shows a ratio of Izo based on Ia satisfies $0.05 \leq (Izo/Ia) \leq 0.20$.

13 Claims, No Drawings

CUBIC BORON NITRIDE SINTERED BODY AND COATED CUBIC BORON NITRIDE SINTERED BODY AND PREPARATION PROCESSES THEREOF

RELATED APPLICATIONS

This is a 371 US National Phase of International Patent Application No. PCT/JP2010/070091, filed Nov. 11, 2010, and published as WO 2011/059020A1 on May 19, 2011, which claims priority to JP 2009-258096, filed Nov. 11, 2009. The contents of the aforementioned applications are incorporated by reference in their entirety.

TECHNICAL FIELD

The present invention relates to a cubic boron nitride sintered body and coated cubic boron nitride sintered body to be used for a cutting tool, etc., and preparation processes thereof.

BACKGROUND ART

As the prior art of the cubic boron nitride sintered body to be used for a cutting tool, etc., there is a sintered body (for example, see Patent Literature 1.), comprising cubic boron nitride, aluminum oxide and/or aluminum nitride and titanium nitride.
[Patent Literature 1] JP H08-109070A

DISCLOSURE OF THE INVENTION

Problems to be Solved by the Invention

In recent years, cutting conditions tend to be severe than before to increase processing efficiency, and tool life has been required to be elongated than the conventional ones. The invention of the above-mentioned Patent Literature 1 is insufficient in wear resistance in the processing wherein a blade-edge temperature becomes high at the time of cutting, for example, in high speed processing of a plain cast iron, etc., and cannot endure such requests sufficiently.

The present invention has accomplished to solve the above-mentioned problems, and an object thereof is to provide a cubic boron nitride sintered body and coated cubic boron nitride sintered body excellent in wear resistance and a preparation processes thereof.

Means to Solve the Problems

The present inventor has carried out researches on wear resistance of a cutting tool made of a cubic boron nitride sintered body in cutting of a plain cast iron. As a result, it could be obtained findings when an α-type $Al_2O_3$ is contained in a binder phase of the cubic boron nitride sintered body, wear resistance of the cubic boron nitride sintered body is increased, and when $ZrB_2$ and ZrO are contained with a certain ratio based on an amount of the α-type $Al_2O_3$, wear resistance of the cubic boron nitride sintered body is further improved.

The cubic boron nitride sintered body of the present invention comprises about 30 to about 70% by volume of cubic boron nitride; and as the reminder, a binder phase comprising at least one selected from an oxide, carbide, nitride and boride of Ti, Al, Zr, Y, Ce, Mg or Ca and mutual solid solutions thereof; and inevitable impurities, wherein the cubic boron nitride sintered body contains $ZrB_2$, $ZrO_2$, ZrO and α-type $Al_2O_3$, and when an X-ray diffraction intensity of a (101) plane of $ZrB_2$ is represented by Izb, an X-ray diffraction intensity of a (110) plane of α-type $Al_2O_3$ is represented by Ia, and an X-ray diffraction intensity of a (111) plane of ZrO is represented by Izo, (Izb/Ia) which shows a ratio of Izb based on Ia satisfies $0.13 \leq (Izb/Ia) \leq 0.30$, and (Izo/Ia) which shows a ratio of Izo based on Ia satisfies $0.05 \leq (Izo/Ia) \leq 0.20$. The coated cubic boron nitride sintered body of the present invention is a material in which a coating is coated on the surface of the cubic boron nitride sintered body of the present invention.

Effects of the Invention

The cubic boron nitride sintered body and coated cubic boron nitride sintered body of the present invention are excellent in wear resistance. When the cubic boron nitride sintered body and coated cubic boron nitride sintered body of the present invention is used as a cutting tool, they accomplish the effects that a tool lifetime can be elongated.

EMBODIMENTS TO CARRY OUT THE INVENTION

The cubic boron nitride sintered body of the present invention comprises about 30 to about 70% by volume of cubic boron nitride; and as the remainder, a binder phase comprising at least one selected from an oxide, carbide, nitride and boride of Ti, Al, Zr, Y, Ce, Mg or Ca and mutual solid solutions thereof; and inevitable impurities. The cubic boron nitride contained in the cubic boron nitride sintered body of the present invention has a function of heightening hardness of the cubic boron nitride sintered body. If the cubic boron nitride is less than about 30% by volume, sufficient hardness cannot be obtained, and many cracks occur at the time of sintering whereby sintering becomes hard. If the cubic boron nitride exceeds 70% by volume, an amount of the binder phase excellent in wear resistance becomes insufficient, and cubic boron nitride causes wear by chemical reaction at the time of cutting so that wear resistance is lowered. Therefore, the cubic boron nitride is made about 30 to about 70% by volume and the binder phase and inevitable impurities as the remainder. Among these, it is further preferred when the cubic boron nitride sintered body comprises 34 to 59% by volume of cubic boron nitride and the remainder of a binder phase and inevitable impurities.

Inevitably contained impurities in the cubic boron nitride sintered body of the present invention may be mentioned WC, Co, Fe, etc. They are considered to be migrated during the preparation step. Total amount of the inevitable impurities in the cubic boron nitride sintered body of the present invention is 2% by volume or less based on the whole cubic boron nitride sintered body, and they do not cause any effect(s) to the characteristic values of the present invention. In the present invention, a little amount of the other component(s) which cannot be said to be inevitable impurities may be added in addition to the cubic boron nitride, the binder phase and inevitable impurities therein so long as it does not impair the characteristics of the cubic boron nitride sintered body of the present invention.

The binder phase contained in the cubic boron nitride sintered body of the present invention comprises at least one selected from an oxide, carbide, nitride or boride of Ti, Al, Zr, Y, Ce, Mg or Ca, and mutual solid solutions thereof. The binder phase of the present invention has functions of firmly bonding cubic boron nitride and cubic boron nitride and improving wear resistance. The cubic boron nitride sintered body of the present invention contains $ZrB_2$, $ZrO_2$, ZrO and α-type $Al_2O_3$, and they are contained as a binder phase. In the binder phase of the present invention, it is preferred to contain $CeO_2$, $Y_2O_3$, MgO, CaO, etc., which are added as a stabilizing agent of $ZrO_2$. In the present invention, $ZrO_2$ means all crystal types of $ZrO_2$ including tetragonal $ZrO_2$, monoclinic $ZrO_2$, cubic $ZrO_2$, etc. In the present invention, it is preferred that the binder phase comprises at least one selected from an oxide, carbide, nitride or boride of Al, Zr, Y, Ce, Mg or Ca, and mutual solid solutions thereof, more preferably at least one selected from an oxide or boride of Al or Zr, and mutual solid solutions thereof, further preferably an oxide of Al, an oxide of Zr and a boride of Zr, and of these, it is particularly preferred that the binder phase comprises an α-type $Al_2O_3$, $ZrB_2$, cubic $ZrO_2$ and ZrO.

When α-type $Al_2O_3$ is added to the cubic boron nitride sintered body of the present invention, wear resistance of the cubic boron nitride sintered body is improved, and when $ZrB_2$ and ZrO are added thereto in certain ratios based on the amount of α-type $Al_2O_3$, wear resistance of the same is further improved. When an X-ray diffraction intensity at the (101) plane of $ZrB_2$ is represented by Izb, an X-ray diffraction intensity at the (110) plane of α-type $Al_2O_3$ is represented by Ia, and an X-ray diffraction intensity at the (111) plane of ZrO is represented by Izo, if (Izb/Ia) which shows a ratio of Izb to Ia satisfies 0.13≤(Izb/Ia)≤0.30, and if (Izo/Ia) which shows a ratio of Izo to Ia satisfies 0.05≤(Izo/Ia)≤0.20, the material is excellent in wear resistance. In the present invention, the X-ray diffraction intensity means a peak height of an X-ray diffraction peak of a crystal plane according to the 2θ/θ method.

If (Izb/Ia) which shows the ratio of Izb to Ia is 0.13 or more, $ZrB_2$ is dispersed in the structure of the cubic boron nitride sintered body, $ZrB_2$ is contained with a larger amount in the grain boundary of α-type $Al_2O_3$ and cubic boron nitride, and in the grain boundary of cubic boron nitride and cubic boron nitride, so that binding strength of these particles becomes high, whereby wear resistance is improved. However, if (Izb/Ia) becomes large exceeding 0.30, hardness of the cubic boron nitride sintered body is lowered whereby wear resistance is lowered. Thus, it was defined to be 0.13≤(Izb/Ia)≤0.30. Among these, 0.15≤(Izb/Ia)≤0.20 is more preferred.

If (Izo/Ia) which shows the ratio of Izo to Ia is 0.05 or more, ZrO is dispersed in the structure of the cubic boron nitride sintered body, ZrO is contained in the grain boundary of α-type $Al_2O_3$ and α-type $Al_2O_3$ in the binder phase in more amount, so that binding strength of these grains becomes high whereby wear resistance is improved. However, if (Izo/Ia) becomes larger exceeding 0.20, hardness of the cubic boron nitride sintered body is lowered and wear resistance is lowered. Therefore, it is set to 0.05≤(Izo/Ia)≤0.20. Among these, 0.13≤(Izo/Ia)≤0.19 is more preferred.

In general, a full width at half maximum intensity (FWHM) of an X-ray diffraction peak is affected by a grain size of crystal grains. In the present invention, when the FWHM in the X-ray diffraction peak of the (111) plane of ZrO is 0.450° or more, wear resistance is improved so that it is more preferred. Here, the FWHM of the X-ray diffraction peak means a FWHM of an X-ray diffraction peak of a crystal surface according to the 2θ/θ method. The FWHM of the X-ray diffraction peak at the (111) plane of ZrO being 0.450° or more means that ZrO is extremely fine crystal grains. By making ZrO extremely fine, dispersibility of ZrO is improved. Therefore, ZrO is finely dispersed in the structure of the cubic boron nitride sintered body, and ZrO is contained in the grain boundary between α-type $Al_2O_3$ and α-type $Al_2O_3$ in much more amount, so that binding strength of these grains becomes high whereby wear resistance is further improved. However, the FWHM of the X-ray diffraction peak at the (111) plane of ZrO of the present invention never exceeds 1.000°, so that the FWHM of the X-ray diffraction peak at the (111) plane of ZrO is practically further preferred in the range of 0.450° to 1.000°, and among these, it is more preferred in the range of 0.460° to 0.500°.

It is further preferred that a part or whole of $ZrO_2$ contained in the cubic boron nitride sintered body of the present invention is cubic $ZrO_2$ since, if so, no phase transformation is caused, and crack is difficulty formed in the cubic boron nitride sintered body. The cubic $ZrO_2$ of the present invention is preferably either a cubic $ZrO_2$ obtained by adding a stabilizer such as $CeO_2$, $Y_2O_3$, MgO and CaO, or a cubic $ZrO_2$ obtained by sintering under high temperature and high pressure.

When an X-ray diffraction intensity of a (111) plane of the cubic $ZrO_2$ which may be contained in the cubic boron nitride sintered body of the present invention is represented by $Izo_2$, it is further preferred if ($Izo_2$/Ia) showing a ratio of the $Izo_2$ to Ia satisfies 0.15≤($Izo_2$/Ia)≤0.60. If the ($Izo_2$/Ia) becomes 0.15 or more, the cubic $ZrO_2$ is dispersed in the structure of the cubic boron nitride sintered body, and the cubic $ZrO_2$ is contained at the grain boundary of the α-type $Al_2O_3$ and the cubic boron nitride, at the grain boundary of the cubic boron nitride and the cubic boron nitride, and at the grain boundary of the α-type $Al_2O_3$ and the α-type $Al_2O_3$ with larger amounts, whereby bonding strengths of these grains are higher so that wear resistance is improved. However, if the ($Izo_2$/Ia) becomes larger exceeding 0.60, hardness of the cubic boron nitride sintered body is lowered whereby wear resistance is also lowered. Therefore, it is more preferred that it satisfies 0.15≤($Izo_2$/Ia)≤0.60. Among these, it is further preferred to be 0.40≤($Izo_2$/Ia)≤0.49.

It is further preferred to form a coating on the surface of the cubic boron nitride sintered body of the present invention since wear resistance is improved. The coating of the present invention comprises at least one selected from the group consisting of an oxide, carbide, nitride and boride of an element of Groups 4 (Ti, Zr, Hf, etc.), 5 (V, Nb, Ta, etc.) and 6 (Cr, Mo, W, etc.) of the Periodic Table, Al and Si, and mutual solid solutions thereof. More specifically, there may be mentioned TiN, TiC, TiCN, TiAlN, TiSiN, CrAlN, $Al_2O_3$, etc. The coating is preferred in either of a single layer or a laminated layer of two or more layers, and an alternately laminated film in which thin films different in compositions with a layer thickness of 5 to 200 nm are alternately laminated is also preferred. If an average film thickness of the coating is less than 0.5 μm, wear resistance is lowered, while if it exceeds 20 μm, fracture resistance is lowered, so that it is preferably 0.5 to 20 μm, and among these, it is more preferred in the range of 1 to 4 μm.

A process for preparing a cubic boron nitride sintered body is a process which comprises:
(A) a step of preparing a mixture comprising about 30 to about 70% by volume of cubic boron nitride, about 25 to about 60% by volume of α-type $Al_2O_3$, about 2.5 to about 5.0% by volume of Al, about 2.5 to about 5.0% by volume of $ZrO_2$, and 0 to about 15% by volume of at least one of TiN, TiC, TiCN and $TiO_2$, and the sum thereof being 100% by volume,
(B) a step of encapsulating the mixture in an apparatus of an ultra-high pressure and high temperature generating device,
(C) a step of sintering the mixture at a sintering temperature of 1300 to 1600° C., and a sintering pressure of 6.5 to 8 GPa, and
(D) a step of cooling the mixture finished the step (C) to normal temperature.

The process for preparing the cubic boron nitride sintered body of the present invention specifically comprises mixing a starting powder a formulation composition of which comprising about 30 to about 70% by volume of cubic boron nitride, about 25 to about 60% by volume of α-type $Al_2O_3$, about 2.5 to about 5.0% by volume of Al, about 2.5 to about 5.0% by volume of $ZrO_2$, and 0 to about 15% by volume of at least one of TiN, TiC, TiCN and $TiO_2$, and among these, preferably about 30 to 70% by volume of cubic boron nitride, about 25 to about 60% by volume of α-type $Al_2O_3$, about 2.5 to about 5.0% by volume of Al, and about 2.5 to about 5.0% by volume of $ZrO_2$, and the sum thereof being 100% by volume in a ball mill, filling the obtained mixed powder in a capsule made of a high melting point metal, then, encapsulating in an apparatus of an ultra-high pressure and high temperature generating device, sintering it at a sintering temperature of 1300 to 1600° C. and a sintering pressure of 6.5 to 8 GPa, after finishing the sintering step, cooled to a normal temperature so that the sintered body can be taken out from the ultra-high pressure and high temperature generating device. Incidentally, with regard to $ZrO_2$ powder as a starting powder, if an average grain size of the primary grains of $ZrO_2$ is 30 to 50 nm, there is an effect that fine $ZrO_2$ or ZrO is easily dispersed in the structure of the cubic boron nitride sintered body. However, in the point of easiness in handling, it is preferred to use secondary grains of $ZrO_2$ powder having an average grain size of 0.1 to 2 μm in which primary grains of $ZrO_2$ having an average grain size of 30 to 50 nm had been aggregated. Also, with regard to $ZrO_2$ powder, partially stabilized zirconia or stabilized zirconia (cubic $ZrO_2$) to which stabilizing agent such as $Y_2O_3$, MgO, CaO, $CeO_2$, etc., had been added in an amount of 1 mol % or more and 16 mol % or less based on the whole $ZrO_2$ is further preferred than high purity $ZrO_2$, since cubic $ZrO_2$ is contained in more amounts in the cubic boron nitride sintered body of the present invention. In the present invention, cubic boron nitride, Al and $ZrO_2$, etc., in the starting powder are reacted at the time of sintering to form $ZrB_2$ or ZrO in the cubic boron nitride sintered body, whereby these components are contained in the resulting sintered body.

The process for preparing the coated cubic boron nitride sintered body of the present invention is a process for preparing a coating on the surface of the cubic boron nitride sintered body obtained by the preparation process of the present invention. The coated cubic boron nitride sintered body of the present invention can be prepared by coating a coating on the surface of the cubic boron nitride sintered body of the present invention according to the conventional CVD method or PVD method.

An X-ray diffraction intensity $I_{zb}$ at the (101) plane of $ZrB_2$, an X-ray diffraction intensity $I_{zo}$ at the (111) plane of ZrO and FWHM of an X-ray diffraction peak of the same, an X-ray diffraction intensity $I_a$ at the (110) plane of α-type $Al_2O_3$, and an X-ray diffraction intensity $I_{zo_2}$ of the (111) plane of $ZrO_2$ in the cubic boron nitride sintered body of the present invention can be measured by using an commercially available X-ray diffraction device. For example, according to the X-ray diffraction device RINT-TTRIII manufactured by Rigaku Corporation, an X-ray diffraction measurement is carried out using a Cu—Kα line with an output of 50 kV and 250 mA with a 2θ/θ integrated optical system to obtain $I_{zb}$, $I_a$, $I_{zo}$, $I_{zo_2}$ and FWHM of the X-ray diffraction peak at the (111) plane of ZrO.

Plane distances of the (101) plane of $ZrB_2$, the (111) plane of ZrO, the (110) plane of α-type $Al_2O_3$ and the (111) plane of cubic $ZrO_2$ in the present invention are described in Powder Diffraction File PDF-2 Release 2004 (hereinafter referred to as PDF card.) of International Centre for Diffraction Data. Bragg angles of the respective crystal planes can be found where $ZrB_2$ by PDF card No. 34-0423, ZrO by PDF card No. 51-1149, α-type $Al_2O_3$ by PDF card No. 10-0173, and cubic $ZrO_2$ by PDF card No. 49-1642.

Example 1

Commercially available cubic boron nitride powder (hereinafter referred to as cBN.) having an average grain size of 2 μm, α-type $Al_2O_3$ powder having an average grain size of 0.1 μm, Al powder having an average grain size of 4 μm, and partially stabilized zirconia powder (hereinafter referred to as PSZ.) having an average grain size of 0.6 μm which is formed by aggregating partially stabilized zirconia crystal grains (primary grain) having an average grain size of 40 nm to which 3 mol % of $Y_2O_3$ had been added based on the whole amount of the partially stabilized zirconia were prepared. These were formulated in a volume ratio of α-type $Al_2O_3$:Al:PSZ=87.2:6.4:6.4, and it was made Powder A. Powder A and the cubic boron nitride powder were formulated with a ratio shown in Table 1. The final formulation composition was shown in Table 2.

TABLE 1

| | Formulation composition (% by volume) | |
|---|---|---|
| Sample No. | cBN | Powder A |
| Present product 1 | 45.00 | 55.00 |
| Present product 2 | 45.00 | 55.00 |
| Present product 3 | 60.00 | 40.00 |
| Present product 4 | 35.00 | 65.00 |
| Comparative product 1 | 45.00 | 55.00 |
| Comparative product 2 | 55.00 | 45.00 |

TABLE 2

| | Final formulation composition (% by volume) | | | |
|---|---|---|---|---|
| Sample No. | cBN | α-$Al_2O_3$ | Al | PSZ |
| Present product 1 | 45.00 | 47.96 | 3.52 | 3.52 |
| Present product 2 | 45.00 | 47.96 | 3.52 | 3.52 |
| Present product 3 | 60.00 | 34.88 | 2.56 | 2.56 |
| Present product 4 | 35.00 | 56.68 | 4.16 | 4.16 |
| Comparative product 1 | 45.00 | 47.96 | 3.52 | 3.52 |
| Comparative product 2 | 55.00 | 39.24 | 2.88 | 2.88 |

Formulated starting powder was subjected to wet mixing by an urethane-lining ball mill, dried mixed powder was filled in a metal capsule having a high-melting point, and then, encapsulated in an apparatus of an ultra-high pressure and high temperature generating device, and sintered under the sintering conditions shown in Table 3.

TABLE 3

| Sample No. | Pressure (GPa) | Temperature (° C.) |
|---|---|---|
| Present product 1 | 7.7 | 1500 |
| Present product 2 | 7.7 | 1300 |
| Present product 3 | 7.7 | 1500 |
| Present product 4 | 7.7 | 1500 |
| Comparative product 1 | 5 | 1500 |
| Comparative product 2 | 5 | 1500 |

The cubic boron nitride sintered bodies of Present products 1 to 4 and Comparative products 1 and 2 obtained as a sintered body were each polished. With regard to the polished sintered bodies, an X-ray diffraction measurement with a 2θ/θ integrated optical system was carried out by using an X-ray diffraction device RINT-TTRIII manufactured by Rigaku Corporation using a Cu—Kα line with an output of 50 kV and 250 mA. As a result, in Present products 1 to 4 and Comparative products 1 and 2, X-ray diffraction peaks of cBN, α-type $Al_2O_3$, $ZrB_2$, cubic $ZrO_2$ and ZrO were observed. From the results, it could be understood that Present products 1 to 4 and Comparative products 1 and 2 were each cubic boron nitride sintered body comprising cBN, α-type $Al_2O_3$, $ZrB_2$, cubic $ZrO_2$ and ZrO. Further, with regard to Present products 1 to 4 and Comparative products 1 and 2, an X-ray diffraction intensity Ia at the (110) plane of α-type $Al_2O_3$, an X-ray diffraction intensity Izb at the (101) plane of $ZrB_2$, an X-ray diffraction intensity Izo at the (111) plane of ZrO, an X-ray diffraction intensity $Izo_2$ at the (111) plane of cubic $ZrO_2$, and FWHM of the X-ray diffraction peak at the (111) plane of ZrO were measured. From Ia, Izb, Izo and $Izo_2$, Izb/Ia, Izo/Ia and $Izo_2$/Ia were obtained. These results are shown in Table 4.

TABLE 4

| Sample No. | Izb/Ia | Izo/Ia | Izo2/Ia | FWHM (°) at (111) face of ZrO |
|---|---|---|---|---|
| Present product 1 | 0.172 | 0.179 | 0.421 | 0.489 |
| Present product 2 | 0.154 | 0.138 | 0.483 | 0.478 |
| Present product 3 | 0.192 | 0.148 | 0.483 | 0.490 |
| Present product 4 | 0.163 | 0.187 | 0.405 | 0.466 |
| Comparative product 1 | 0.107 | 0.281 | 0.477 | 0.392 |
| Comparative product 2 | 0.112 | 0.221 | 0.466 | 0.427 |

Cubic boron nitride sintered bodies of Present products 1 to 4 and Comparative products 1 and 2 were polished, and further mirror polished. The cross-sectional structures of the obtained cubic boron nitride sintered bodies were observed by using a scanning type electron microscope with a 3000-fold view field. In the cross-sectional structure photographs obtained by the scanning type electron microscope, image analyses were carried out by making a relatively black portion as a cubic boron nitride portion, and a relatively white portion as a binder phase portion based on the color tone thereof. In this case, when the color tones of the photographs are shown by histogram, two peaks can be confirmed. The middle point of the peak and the peak is made a threshold, and the color tones are divided into two values of black and white so that the cubic boron nitride portion and the binder phase portion can be divided on the photograph. The respective area %'s were measured, whereby area % of the cubic boron nitride and that of the binder phase were determined. In Present products 1 to 4 and Comparative products 1 and 2, arbitrary three-dimensional ununiformity is not provided to the cubic boron nitride sintered body structure. Thus, area % in the cross-sectional structure of the cubic boron nitride sintered body coincides with volume % of the cubic boron nitride portion and the binder phase portion contained in the cubic boron nitride sintered body, whereby volume % of the respective phases can be determined. The volume % of the cubic boron nitride and the volume % of the binder phase of Present products 1 to 4 and Comparative products 1 and 2 are shown in Table 5.

TABLE 5

| Sample No. | Cubic boron nitride (volume %) | Binder phase (volume %) |
|---|---|---|
| Present product 1 | 44.0 | 56.0 |
| Present product 2 | 43.8 | 56.2 |
| Present product 3 | 58.3 | 41.7 |
| Present product 4 | 34.1 | 65.9 |
| Comparative product 1 | 44.2 | 55.8 |
| Comparative product 2 | 54.3 | 45.7 |

Cubic boron nitride sintered bodies of Present products 1 to 4 and Comparative products 1 and 2 obtained as sintered bodies were cut in a triangle pole shape having two hypotenuses of 3 mm×the base of 4.24 mm×thickness of 1.8 mm, and brazed to the base metal of the cemented carbide having an insert shape of SPGW120412 to prepare a cutting tool. Further, on the surface of the cutting tool of Present product 1, TiN with an average film thickness of 3 μm was deposited by using a PVD device to prepare Present product 5. With regard to these cutting tools, cutting tests of Tests 1 and 2 shown in the following were carried out.

[Test 1]
Work piece material: Plain cast iron
Cutting speed Vc: 1000 m/min
Depth of cut ap: 0.07 mm
Feed rate f: 0.70 mm/rev
Cutting form: Wet turning
Cutting time: 13 min.

[Test 2]
Work piece material: Plain cast iron
Cutting speed Vc: 1000 m/min
Depth of cut ap: 0.03 mm
Feed rate f: 0.35 mm/rev
Cutting form: Wet turning
Cutting time: 26 min.

Flank wear of the blade edge of the tool after cutting tests in Tests 1 and 2 are shown in Table 6.

TABLE 6

| Sample No. | Test 1 | Test 2 |
|---|---|---|
| Present product 1 | 0.35 mm | 0.15 mm |
| Present product 2 | 0.38 mm | 0.16 mm |
| Present product 3 | 0.36 mm | 0.20 mm |
| Present product 4 | 0.40 mm | 0.13 mm |
| Present product 5 | 0.31 mm | 0.13 mm |
| Comparative product 1 | 0.52 mm | 0.24 mm |
| Comparative product 2 | 0.55 mm | 0.26 mm |

As shown in Table 6, in Test 1 and Test 2, it can be understood that Present products 1 to 5 are excellent in wear resistance since flank wear of the blade edge of the tool is little than those of Comparative products 1 and 2. In the cutting conditions of Test 1, Present products 1 to 5 can be further used for cutting until flank wear of the blade edge of the tool became 0.52 mm. In the cutting conditions of Test 2, Present products 1 to 5 can be further used for cutting until flank wear of the blade edge of the tool became 0.24 mm. From the above results, it can be understood that tool lives of Present products 1 to 5 are longer than those of Comparative products 1 and 2.

The invention claimed is:
1. A cubic boron nitride sintered body which comprises about 30 to about 70% by volume of cubic boron nitride;

and as the reminder, a binder phase comprising at least one selected from an oxide, carbide, nitride and boride of Ti, Al, Zr, Y, Ce, Mg or Ca and mutual solid solutions thereof; and inevitable impurities, wherein the cubic boron nitride sintered body contains α-type $Al_2O_3$, $ZrB_2$, $ZrO_2$ and ZrO, and when an X-ray diffraction intensity of a (110) plane of α-type $Al_2O_3$ is represented by Ia, an X-ray diffraction intensity of a (101) plane of $ZrB_2$ is represented by Izb, and an X-ray diffraction intensity of a (111) plane of ZrO is represented by Izo, (Izb/Ia) which shows a ratio of Izb based on Ia satisfies 0.13≤(Izb/Ia)≤0.30, and (Izo/Ia) which shows a ratio of Izo based on Ia satisfies 0.05≤(Izo/Ia)≤0.20.

2. The cubic boron nitride sintered body according to claim 1, wherein the (Izb/Ia) satisfies 0.15≤(Izb/Ia)≤0.20.

3. The cubic boron nitride sintered body according to claim 1, wherein the (Izo/Ia) satisfies 0.13≤(Izo/Ia)≤0.19.

4. The cubic boron nitride sintered body according to claim 1, wherein a full width at half maximum intensity (FWHM) in X-ray diffraction peak of the (111) plane of ZrO is 0.450° or more.

5. The cubic boron nitride sintered body according to claim 1, wherein a full width at half maximum intensity (FWHM) in X-ray diffraction peak of the (111) plane of ZrO is in the range of 0.450° to 1.000°.

6. The cubic boron nitride sintered body according to claim 1, wherein a full width at half maximum intensity (FWHM) in X-ray diffraction peak of the (111) plane of ZrO is in the range of 0.460° to 0.500°.

7. The cubic boron nitride sintered body according to claim 1, wherein it comprises cubic $ZrO_2$, and when an X-ray diffraction intensity at a (111) plane of cubic $ZrO_2$ is represented by $Izo_2$, ($Izo_2$/Ia) which shows a ratio of $Izo_2$ to Ia satisfies 0.15≤($Izo_2$/Ia)≤0.60.

8. The cubic boron nitride sintered body according to claim 7, wherein the ($Izo_2$/Ia) satisfies 0.40≤($Izo_2$/Ia)≤0.49.

9. The cubic boron nitride sintered body according to claim 1, wherein the cubic boron nitride sintered body comprises about 30 to about 70% by volume of cubic boron nitride, and as the reminder, a binder phase comprising at least one of an oxide, carbide, nitride and boride of Al, Zr, Y, Ce, Mg or Ca and mutual solid solutions thereof, and inevitable impurities.

10. The cubic boron nitride sintered body according to claim 1, wherein the binder phase comprises at least one selected from the group consisting of an oxide or a boride of Al or Zr, and mutual solid solutions thereof.

11. The cubic boron nitride sintered body according to claim 1, wherein the binder phase comprises an oxide of Al, an oxide of Zr and a boride of Zr.

12. The cubic boron nitride sintered body according to claim 1, wherein the binder phase comprises α-type $Al_2O_3$, $ZrB_2$, cubic $ZrO_2$ and ZrO.

13. A coated cubic boron nitride sintered body which comprises the cubic boron nitride sintered body according to claim 1 on the surface of which is coated with a coating.

* * * * *